United States Patent
Hirata et al.

(10) Patent No.: US 9,471,255 B2
(45) Date of Patent: *Oct. 18, 2016

(54) TAPE STORAGE DEVICE AND WRITING METHOD THEREFOR

(71) Applicant: International Business Machines Corporation, Armonk, NY (US)

(72) Inventors: Takamasa Hirata, Tokyo (JP); Setsuko Masuda, Tokyo (JP); Yuhko Mori, Tokyo (JP); Yutaka Oishi, Tokyo (JP); Terue Watanabe, Tokyo (JP)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/943,487

(22) Filed: Nov. 17, 2015

(65) Prior Publication Data

US 2016/0077766 A1     Mar. 17, 2016

Related U.S. Application Data

(63) Continuation of application No. 14/564,909, filed on Dec. 9, 2014, now Pat. No. 9,218,130, which is a continuation of application No. 13/698,353, filed as application No. PCT/JP2011/057005 on Mar. 23, 2011, now Pat. No. 8,972,654.

(30) Foreign Application Priority Data

Jun. 25, 2010 (JP) ................................ 2010-144934

(51) Int. Cl.
G06F 12/02 (2006.01)
G06F 3/06 (2006.01)
(Continued)

(52) U.S. Cl.
CPC ............. *G06F 3/0682* (2013.01); *G06F 3/061* (2013.01); *G06F 3/0608* (2013.01);
(Continued)

(58) Field of Classification Search
CPC .... G06F 3/061; G06F 3/0638; G06F 3/0682; G06F 3/0608; G06F 3/0643; G06F 3/0619; G06F 3/0652; G06F 17/30174; G11B 20/1202; G11B 2220/956
See application file for complete search history.

(56) References Cited

U.S. PATENT DOCUMENTS

5,572,378 A    11/1996  Schwarz et al.
7,561,372 B2    7/2009  Shiratori
(Continued)

FOREIGN PATENT DOCUMENTS

CN      101123092 A    2/2008
CN      100495538 C    6/2009
(Continued)

OTHER PUBLICATIONS

U.S. Appl. No. 13/698,353.
(Continued)

*Primary Examiner* — Hiep Nguyen
(74) *Attorney, Agent, or Firm* — Francis Lammes; Stephen J. Walder, Jr.; Randall J. Bluestone (57) ABSTRACT

A mechanism is provided for tape writing of small transactions. A first file is written as a plurality of fixed-length data sets (DS), the DS number of the final DS in the plurality of DS is stored in memory as #N(DS#N) and the WP number as #M(WP#M), and the final first file and the second file in the DS following the final DS(DS#N, WP#M) containing the first file are packed and written in sequential DS units, and are stored as DS#N, DS#N+1, etc. and WP#M+1 in sequential order in DS containing the second file. The remaining first, second, or third file is packed and DS#N with WP#M is overwritten as DS#N with WP#M+2, and the remaining #N in the DS numbers of the second file and the third file in the subsequent DS are written as DS#N+1, N+2, etc. with WP#M+2, and the DS#N, #N+1, #N+2, etc. with WP#M+2 are stored.

18 Claims, 7 Drawing Sheets

(51) Int. Cl.
  *G11B 20/12* (2006.01)
  *G06F 17/30* (2006.01)
(52) U.S. Cl.
  CPC .......... *G06F 3/0619* (2013.01); *G06F 3/0638* (2013.01); *G06F 3/0643* (2013.01); *G06F 3/0652* (2013.01); *G06F 17/30174* (2013.01); *G11B 20/1202* (2013.01); *G11B 2220/956* (2013.01)

(56) References Cited

U.S. PATENT DOCUMENTS

| | | | |
|---|---|---|---|
| 8,037,346 B2 | 10/2011 | Katagiri et al. | |
| 8,176,243 B2 | 5/2012 | Katori et al. | |
| 8,972,654 B2* | 3/2015 | Hirata | G06F 3/061 711/111 |
| 9,218,130 B2* | 12/2015 | Hirata | G06F 3/0608 711/111 |
| 2003/0142428 A1* | 7/2003 | Jauette | G11B 20/10527 360/51 |
| 2004/0230741 A1 | 11/2004 | Watanabe | |
| 2005/0207221 A1* | 9/2005 | Bartlett | G11B 23/288 365/185.03 |
| 2006/0164744 A1* | 7/2006 | Greco | G11B 5/00817 360/55 |
| 2007/0053091 A1 | 3/2007 | Shiratori | |
| 2007/0079059 A1 | 4/2007 | Itagaki et al. | |
| 2008/0140927 A1 | 6/2008 | Katori et al. | |
| 2008/0294954 A1 | 11/2008 | Katagiri et al. | |
| 2009/0180212 A1* | 7/2009 | Katagiri | G11B 5/00817 360/71 |
| 2010/0053801 A1* | 3/2010 | Katagiri | G11B 5/00834 360/77.12 |
| 2011/0122522 A1* | 5/2011 | Itagaki | G11B 27/032 360/15 |
| 2012/0036318 A1 | 2/2012 | Cideciyan et al. | |

FOREIGN PATENT DOCUMENTS

| | | |
|---|---|---|
| DE | 69836849 T2 | 10/2007 |
| JP | 06-139650 | 5/1994 |
| JP | 2004-341925 | 12/2004 |
| WO | WO 2007/102434 A1 | 9/2007 |
| WO | WO 2011/161997 A1 | 12/2011 |

OTHER PUBLICATIONS

U.S. Appl. No. 14/564,909.
Notification of International Search Report (PCT/ISA/210), International Search Report (PCT/ISA/220) and Written Opinion (PCT/ISA/237) dated Jun. 14, 2011, International Application No. PCT/JP2011/057005), non translated, 10 pages.
Notification of Transmittal of Translation of the International Preliminary Report and on Patentability and Written Opinion dated Jan. 24, 2013, International Application No. PCT/JP2011/057005, 7 pages.

* cited by examiner

MEMORY MAP IN CARTRIDGE MEMORY (CM)

CORRESPONDING RELATIONSHIP BETWEEN DATA SET NO. AND WRITEPASS

| DATA SET # | WRITEPASS (WP) |
|---|---|
| 2 | 2 |
| 101 | 3 |
| . . . | . . . |
| 150 | 5 |
| . . . | . . . |
| 206 | 7 |
| 1005 | 8 |

TAPE STORAGE DEVICE AND WRITING METHOD THEREFOR

BACKGROUND

The present invention relates to a tape writing method and, more specifically, to a writing method and tape recording device (tape drive) for situations in which there is a request to write small transactions to tape.

Typical examples of tape drives include Linear Tape-Open (LTO) tape drives and the IBM Enterprise Tape Drive TS1130. There are two general classes of tape media used in these tape drives: data cartridges and write once read many (WORM) cartridges. The following explanation makes reference to CD recording media. The two cartridges correspond to CD-RW (compact disc-rewritable) and CD-R (compact disc recordable). Data stored in the former can be erased and rewritten. This cannot be done in the case of the latter.

A host sends a variable-length transaction (either a file or data) to a tape drive to be recorded (Write command). The data is sent from the host as variable-length data. When the data is written to the tape medium, the tape drive reconstructs the data as 1.6 MB fixed-length data called a DataSet (DS).

The tape drive writes the data to the tape medium in data set units. The data sets are identified using two IDs: a data set number (DS#) and a WritePass (WP). The DS# begins at 0. The DS# is used in the sense that, once data set DS#N has been filled with data, it is packed into data set DS#N+1. The WP indicates the generation/freshness of the DS#. The data sets are usually written to the data media in sequential order with respect to DS#.

For example, when the content of DS#N is updated, the DS#N is written using a WP higher than the WP of any data set on the tape. When a data set is read and the WP of DS#N is #M, the tape drive then reads DS#N+1 with a WP of M and over. In other words, when DS#N is updated, logically speaking a DS after DS#N+1, which has already been written, has been erased, and the older DS can no longer be read.

In an IBM Enterprise Tape Dive or a Linear Tape-Open (LTO) compatible tape drive, data is written to the tape medium sequentially in fixed-length data set (DS) units. The tape drive sequentially reads DS written to the tape in response to a read command from a host. A single tape cartridge can be used over and over by a tape drive by overwriting old DS with new DS.

Figure 1:
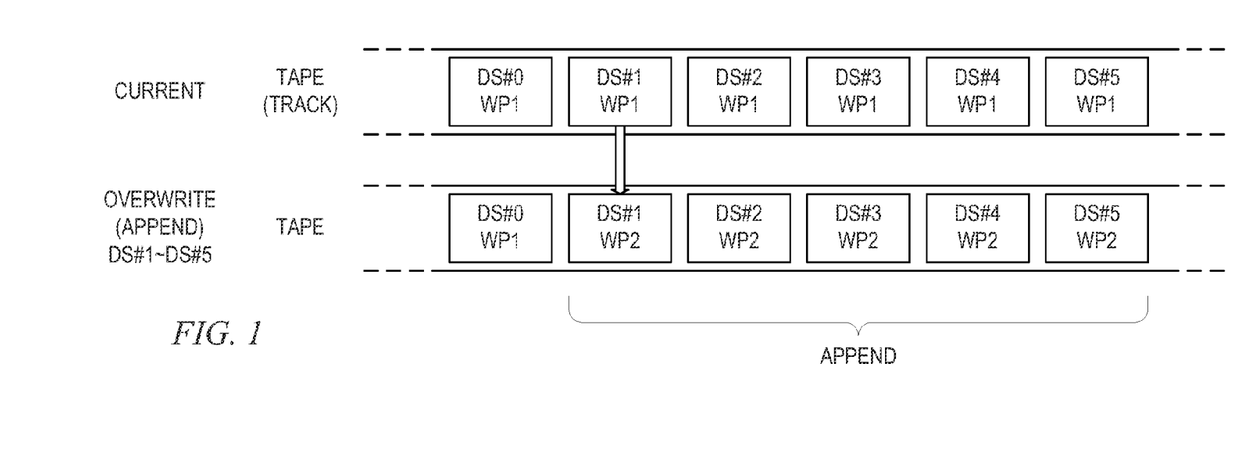
FIG. 1 depicts a diagram showing a plurality of data sets (DS) written on a tape medium.

FIG. 1 is a diagram showing a plurality of DS written on a tape medium. The DS on the tape are overwritten. The tape drive at first writes new data in DS units on the tape medium in sequential order with respect to the DS number (DS#). When DS on the tape is overwritten, it is desirable to substantially overwrite the old DS on the tape medium with a new DS using the same, unaltered DS#.

In the lower section of FIG. 1, DS#1 through #5 have been overwritten. Each DS written to the tape is assigned a DS# and a WritePass (WP) as identifiers. During data writing, the tape drive increases the DS# by one increment each time a DS is written to the tape. The WP of the same DS# indicates the number of times a writing operation has been performed. An increment is added each time an overwriting operation is performed and each time a retry operation is performed when an error occurs. When a DS writing operation fails at DS#X (where X is an arbitrary number), the tape drive allows the increased value for the WP as a DS of a subsequent number.

The upper section of FIG. 1 indicates the current data writing state. This is the initial stage in which each DS has been successfully written to the tape. In the current state, each DS has only been written to once. As a result, each DS is assigned the same value (WP1). In the lower section of FIG. 1, the WP for overwritten DS#1 through #5 is increased from 1 to 2. The tape drive differentiates an old DS from a new DS in the same overwritten DS# on the tape using the WP value, and reads the new DS.

The complete overwriting of an old DS by a new DS with the same DS# is desirable from the standpoint of data integrity (DI). However, because some errors occur in the write control of a tape drive, both ends of an old DS written to a tape remain. Therefore, when many overwriting operations have been performed, many DS with the same DS# remain on the tape. During sequential reading, the tape drive transfers to the host the DS with the highest WP from among a plurality of DS with the same DS# as the new DS in order to ensure data integrity (DI).

The length of a data set written to a tape medium is approximately 10 cm. When the tape drive write data sets, the interval of sequential data sets has to be less than 4 m. It is because the range to be searched is limited when data sets are read.

The interval between data sets is usually as short as possible. When the interval increases, the recording density in the portion decreases, and the amount of data written to the tape medium decreases. Also, when a certain data set is overwritten (data including a certain data set is updated), the writing begins at the start of the previously written data set with the same DS#. This is to avoid sending to the host a data set containing data prior to the update when the data set is read.

The host can write special data called a file mark (FM) on the tape medium. An FM is the equivalent of a bookmark, and is used as a separator between files. An FM is used for positioning when written data is read.

One FM is written between files and two FM are written at the end of the final file. When using these FM, the host writes two FM when it finishes the writing of files. When the next file is written, the data is usually written so as to overwrite the last FM. The last FM is also overwritten in a WORM cartridge. When data written at the end of data written to a cartridge has a plurality of FM, some of the FM can be deleted.

Figure 2:
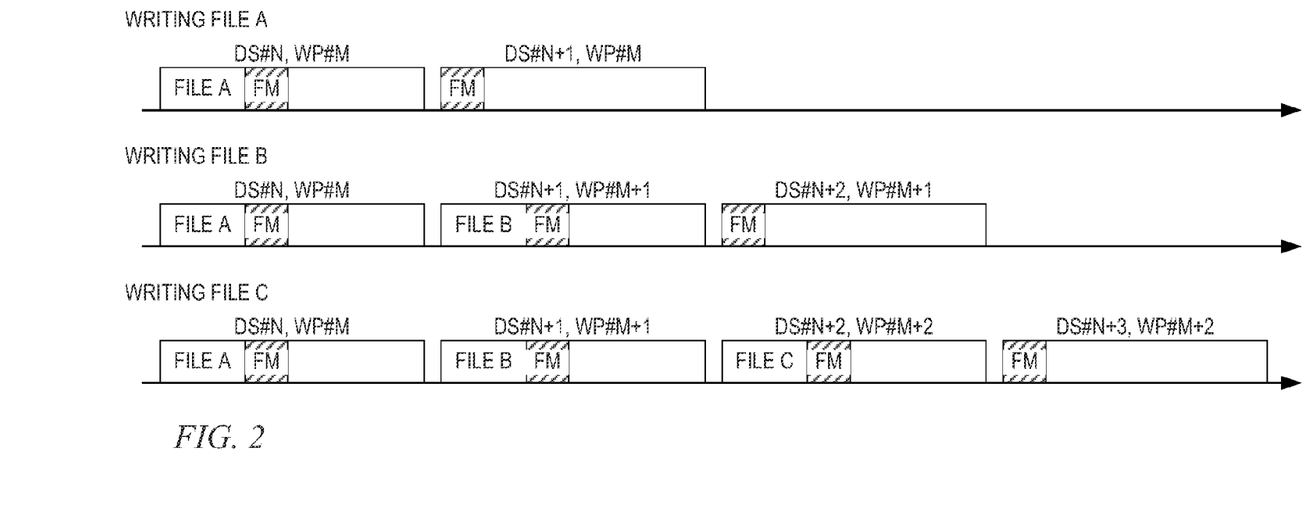
FIG. 2 depicts a diagram showing two file marks (FM) written for each file written on the tape.

FIG. 2 is a diagram showing two FM written each time a file is written to tape. In order to realize this function, when a current tape drive writes a plurality of FM to a WORM cartridge, the initial FM and the second and subsequent FM are written to separate data sets. First, File A sent from the host is stored in the buffer memory of the tape drive. When two FM have been written, File A and an FM are stored in DS#N. The data is written to the tape medium with another FM stored in DS#N+1. Next, the drive writes File B and two FM from the host to follow the first FM written after File A. The tape drive writes File B and an FM to DS#N+1. When File A is written, DS#N+1 is overwritten using a WP higher than the WP used for the previously written DS#N+1. Afterwards, an FM is stored in DS#N+2, and DS#N+2 is written after DS#N+1 using the same WP as the last DS#N+1 that was written. Afterwards, File C and so forth are written in the same manner.

International Laid-open Patent Publication No. WO2007/102434 provides a technology for continuing to read data quickly and accurately after a reading error has occurred. This patent literature belongs to the technical field of the present invention in that a tape reading device is connected to a host computer, but it only presents a reading technology.

SUMMARY

In one illustrative embodiment, a method, in a data processing system, is provided for writing a file in accordance with a write request from a host to a device for recording to tape in fixed-length data set (DS) units. In this writing method, the tape writing method writes a first file as a set of DS to the tape medium in a case in which a write request for the first file is received; stores in non-volatile memory a DS number of a last DS in the set of DS as #N(DS#N) and the WP number as #M(WP#M); write to the tape medium in sequential DS units the first file and the second file in the DS following the last DS containing the first file in a case in which a write request for a second file is received following the first file; and store in non-volatile memory the DS containing the second file with incremental DS numbering and WP#M+1.

In other illustrative embodiments, a computer program product comprising a computer useable or readable medium having a computer readable program is provided. The computer readable program, when executed on a computer, causes the computer to perform various ones of, and combinations of, the operations outlined above with regard to the method illustrative embodiment.

In yet another illustrative embodiment, a tape recording device is provided. The tape recording device may comprise a buffer for temporarily storing files from the host, a tape medium to which the files stored in the buffer are written in fixed-length DS units, and a read/write control mechanism for reading and writing files to and from the tape medium in data set (DS) units. The read/write control mechanism executes various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

DETAILED DESCRIPTION

The following is an explanation of some typical embodiments (referred to simply as embodiments) of the method of the present invention used by a tape drive to write data (files, transactions). These embodiments are for illustrative purposes only, and the selection method of the present invention is not limited to them.

Figure 3:
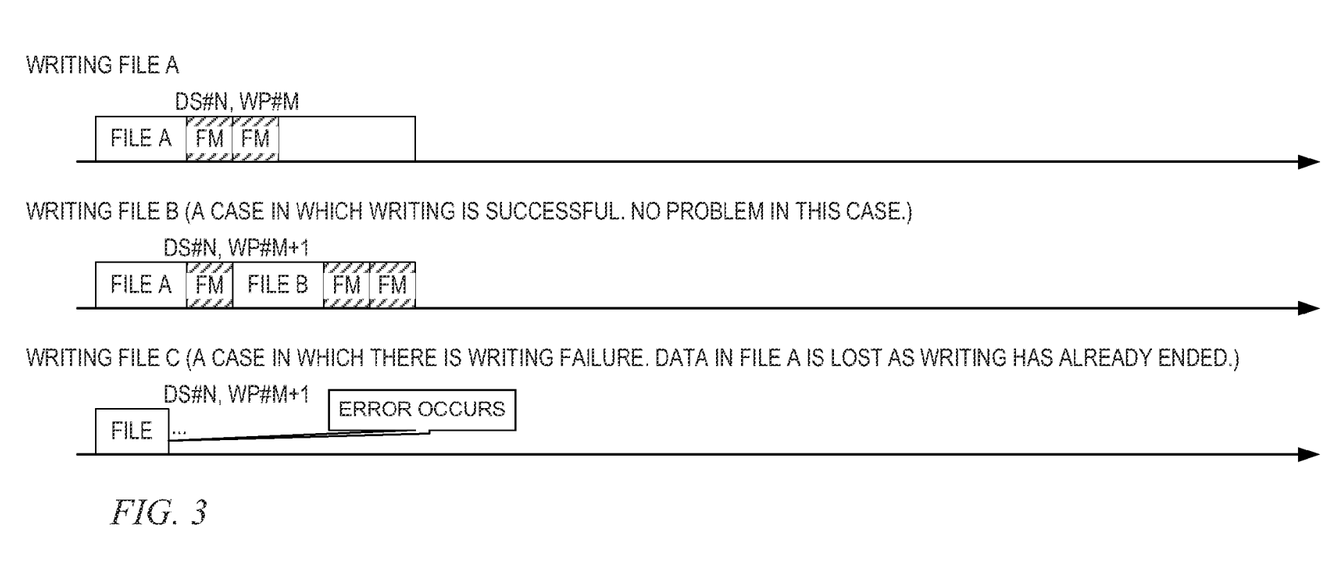
FIG. 3 depicts a diagram showing the occurrence of an error in which a file (File A) and the next file (File B) are not written to separate DS#.

FIG. 3 is a diagram showing a situation in which an error occurs when a file (File A) and the next file (File B) are not written to separate DS#. When the tape drive stores two FM in a data set, and writes File A and two FM, an overwriting operation occurs. When all of this has been packed in DS#N, overwriting occurs, the last FM is deleted, and DS#N has to be rewritten in order to write File B.

When File B is written, File B is also added to an empty area in DS#N, and DS#N is written. When an error occurs during the writing operation for File B, data is even lost in File A, which is data that has already been written and ensured. One means of preventing the loss of File A when a writing error occurs is to write B to a separate DS. A second and subsequent FM separate another DS so that DS#N containing File A does not have to be written again when File B is written. A WORM cartridge does not allow File A and the FM immediately after the file to be overwritten once they have been written.

Figure 4:
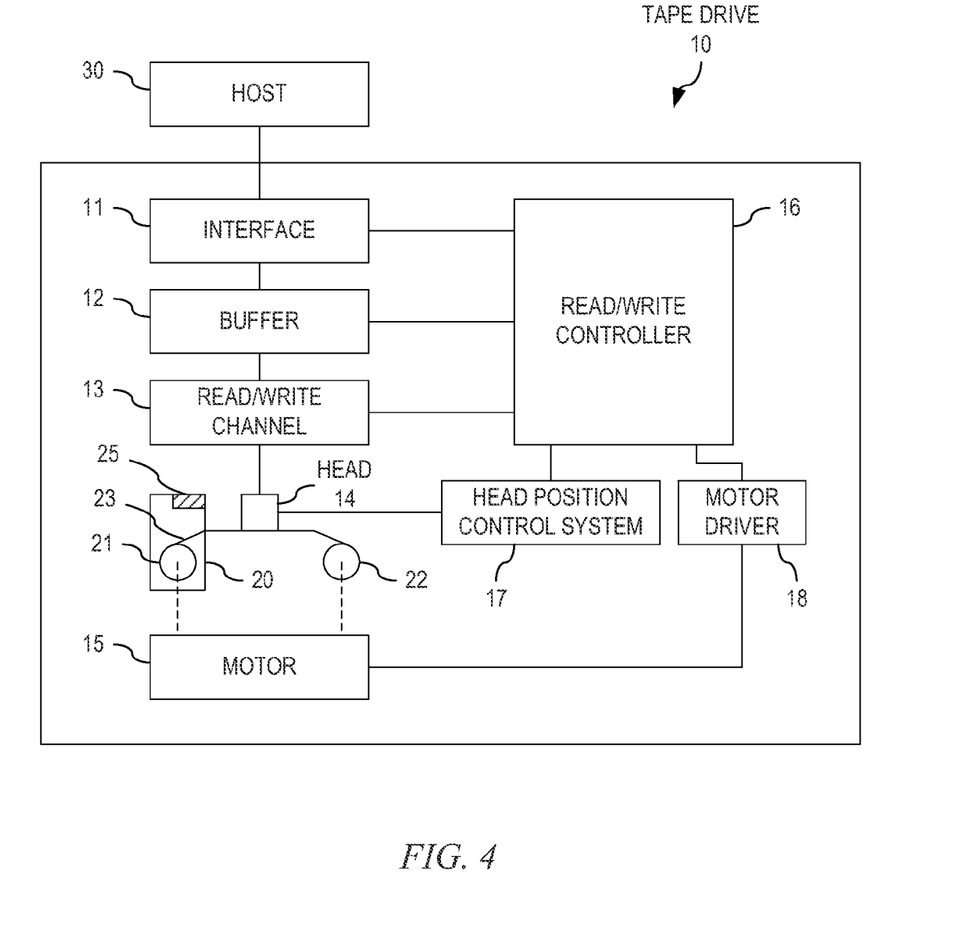
FIG. 4 depicts a diagram showing an example of a configuration for a tape drive 10 in which the present embodiment can be realized.

FIG. 4 is a diagram showing an example of a configuration for a tape drive 10 in which the present embodiment can be realized. The tape drive 10 writes and overwrites a plurality of files or data (files) sent from the host 30 to a tape medium in fixed-length data set (DS) units. A DS is a unit for writing a grouping of a plurality of files to tape with a fixed-length format structure. The present invention does not exclude the use of variable-length DS. However, the embodiments explained below use fixed-length DS.

The tape drive 10 includes an interface 11, a buffer 12, a channel 13, a head 14, a motor 15, and reels 22 for winding the tape 23. It also includes a read/write controller 16, a head position control system 17, and a motor driver 18. Two motors 15 can be provided. A tape cartridge 20 is detachably mounted in the tape drive 10.

The tape cartridge 20 includes tape 23 wound around a reel 21. The tape 23 moves in a longitudinal direction from reel 21 towards reel 22 or from reel 22 towards reel 21 as the reels 21, 22 rotate. The tape 23 can be a tape medium other than magnetic tape. So that the tape can be moved at high speed to the target position during reading, the tape drive stores attribute information on the tape cartridge (called a tape directory) in the non-contact non-volatile memory installed inside the tape cartridge which is called the cartridge memory (CM) 25. Data is read from and written to the cartridge memory CM25 for the tape 20 by the tape drive 10 in non-contact fashion.

Figure 7:
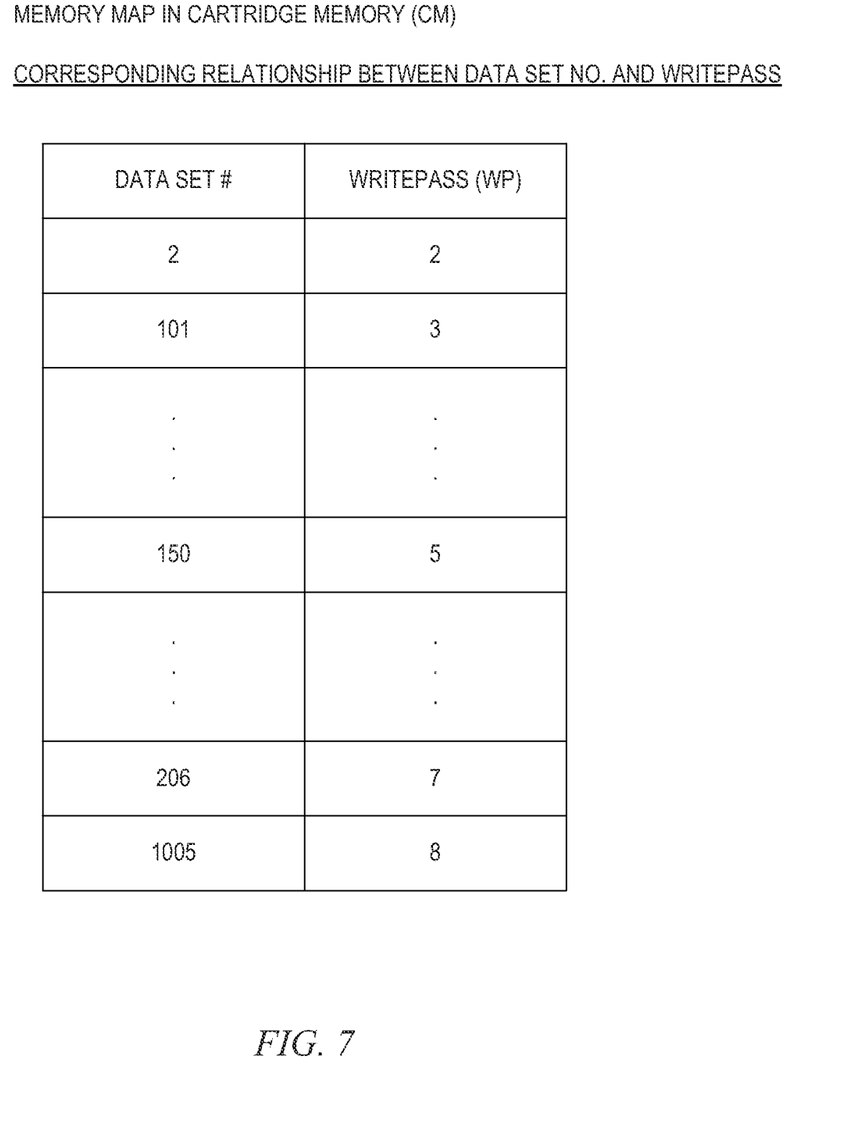
FIG. 7 depicts a table showing the memory map of the attribute information for the tape cartridge recorded in the cartridge memory (CM)

FIG. 7 is a table showing the memory map of the attribute information for the tape cartridge recorded in the cartridge memory (CM). When the tape drive shifts the writing position and retries during overwriting, DS information is written to the CM from the retry. In order to prevent problems such as an inability to overwrite due to damaged media, the tape drive shifts the writing position during overwriting and writes this to the CM attached to the tape cartridge. For example, the newest value for the number of writing operations performed at a specific DS# is recorded as the WP value in the CM.

When the tape 23 is moving in a longitudinal direction, the head 14 reads information to the tape 23 or reads information from the tape 23. The motor 15 rotates the reels 21, 22. One motor 15 is shown here, but a motor is preferably provided for each reel 21, 22.

The read/write control 16 controls the entire tape drive 10. For example, the writing of data to the tape 23 and the reading of data from the tape 23 is controlled in accordance with commands received by the interface 11. It also controls the head position control system 17 and the motor driver 18, adds and reads correction codes for written data, and corrects errors in read data. The motor driver 18 drives the motor 15.

The interface 11 communicates with a host 30 which is an example of a higher-level device. It receives from the host 30 commands for moving the tape 23 to a target position, commands for writing data to the tape 23, and commands for reading data from the tape 23. These correspond to positioning commands, Write commands, synchronization commands (Flush), and Read commands. Also, the interface 11 replies to the host 30 indicating whether the processing corresponding to these commands has been successful or a failure. The host 30 indicates the position and number of variable-length data [sets] in these commands, and sends them to the tape drive 10.

The buffer 12 is memory for storing data to be written to the tape 23 and data read from the tape 23. It can be configured, for example, from DRAM. Also, the buffer 12 is composed of a plurality of fixed-length buffer segments, and each buffer segment stores a data set (DS), which is the unit in which data is read from and written to the tape 23. A data segment is composed of a portion of data or a plurality of data sent from the host 30. Data passing through the read/write channel 13 is written to the tape 23 by the head 14 in DS units (e.g., 400 KB or 1.6 MB). A synchronization command is a command for writing data stored in the buffer to the tape.

Figure 5:
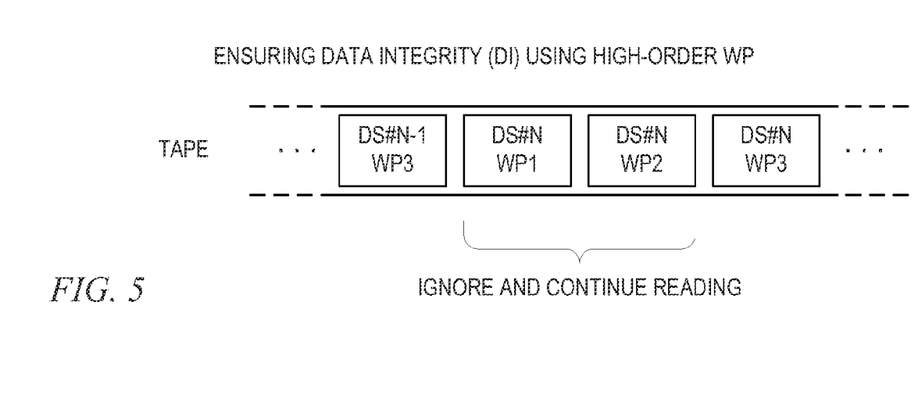
FIG. 5 depicts a diagram showing a case in which the DS in the same DS#N on the tape has been overwritten three times, and the old DS has been completely overwritten.

FIG. 5 is a diagram showing a case in which the DS in the same DS#N on the tape has been overwritten three times, and the old DS has been completely overwritten. When data is read, the tape drive reads data in DS# order. When there is a plurality of DS at the same DS#N, the DS data with the largest WP is read. In a case in which the tape drive has overwritten the DS with a specific number, the CM directory is referenced when the DS is read. This does not affect reading performance.

When read in sequential order and a DS with a certain WP is read, the DS with the lower WP is an unwanted (obsolete) file (data). The unwanted data is ignored based on the WP, and the tape drive continues to read the tape. For example, when the tape drive reads DS#N, it reads three DS#N with WP1, 2 and 3. When the WP value of DS#N−1 written to the tape is 3, the DS with WP1 and WP2 lower than 3 are ignored.

Figure 6:
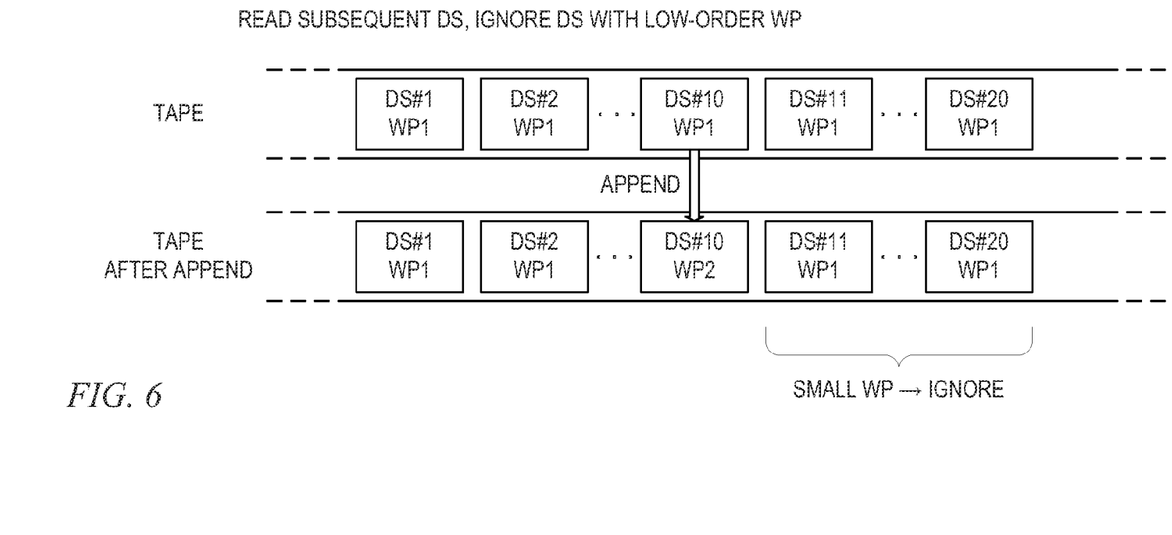
FIG. 6 depicts a diagram showing a case in which the DS in DS#10 has been overwritten (lower drawing) after DS have been initially written to the tape from #1 to #20 (upper drawing)

FIG. 6 is a diagram showing a case in which the DS in DS#10 has been overwritten (lower drawing) after DS have been initially written to the tape from #1 to #20 (upper drawing). The tape drive ignores the DS (DS#11-#20) after the overwritten DS in DS#10, and reads sequentially. In the reading method for DS#10-#20, the tape drive assigns WP2 to the overwritten DS#10 to identify the old DS (WP1) in DS#10. After DS#10 has been overwritten (lower drawing), the tape drive ignores the initially written DS#11-#20 during the reading process. Even though there are DS on the tape at #11, 12, etc., the tape drive considers the DS after DS#10 to be non-existent because the WP for the old DS#11, 12, etc. are lower than the WP for the subsequently written DS#10. Thus, the example in FIG. 6 does not affect reading performance, and there is no problem with data integrity (DI) in which data included in old data sets is mistakenly sent to the host.

Figure 8:
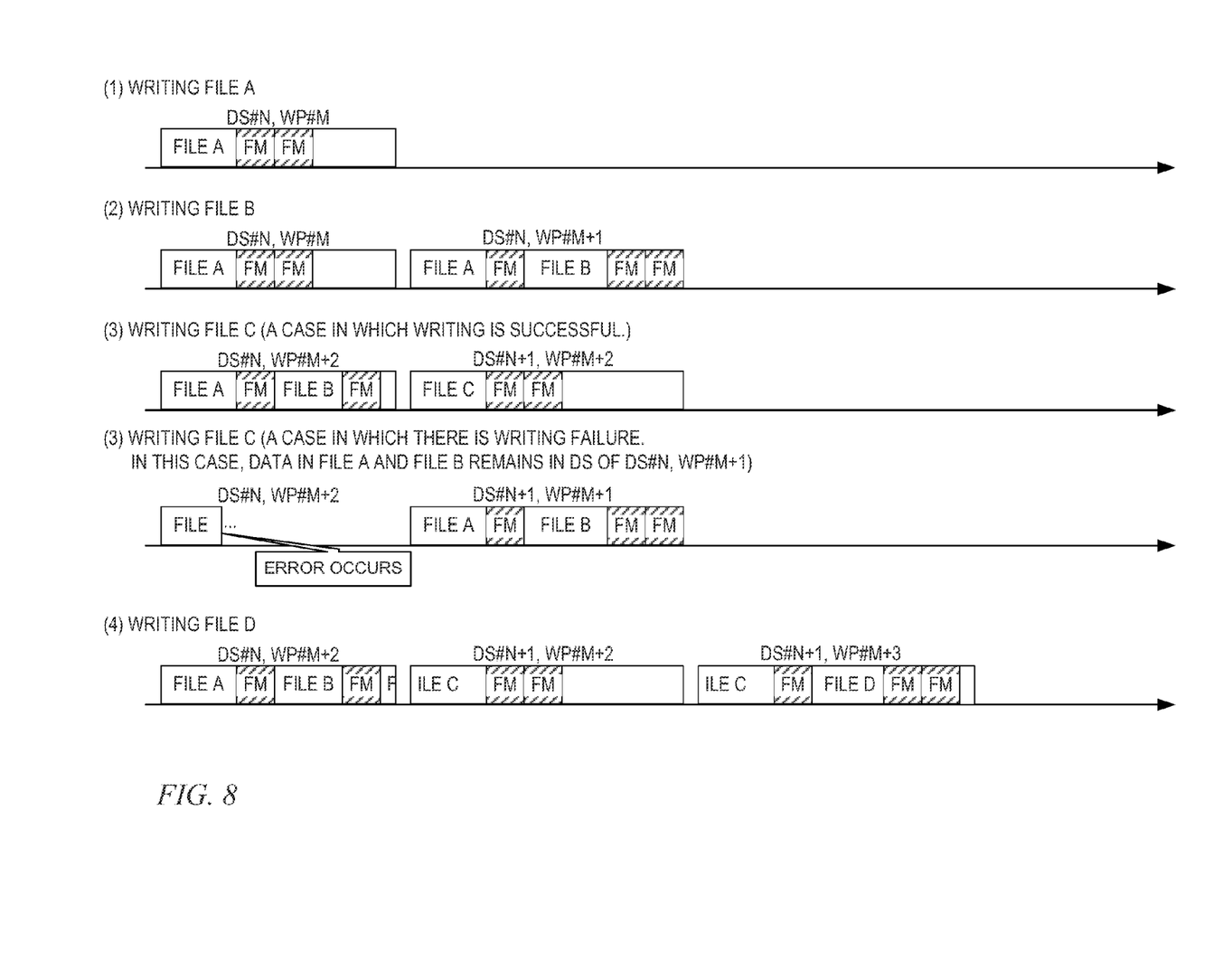
FIG. 8 depicts a diagram used to explain the writing method of the present invention.

The writing method in the present invention will now be explained using FIG. 8.

In the writing method of the present invention, each file is written in a new procedure using WP. This new writing method improves the recording density of data on a tape medium when the file size is small relative to the capacity of a data set, and data integrity and writing performance are not adversely affected.

Figure 9:
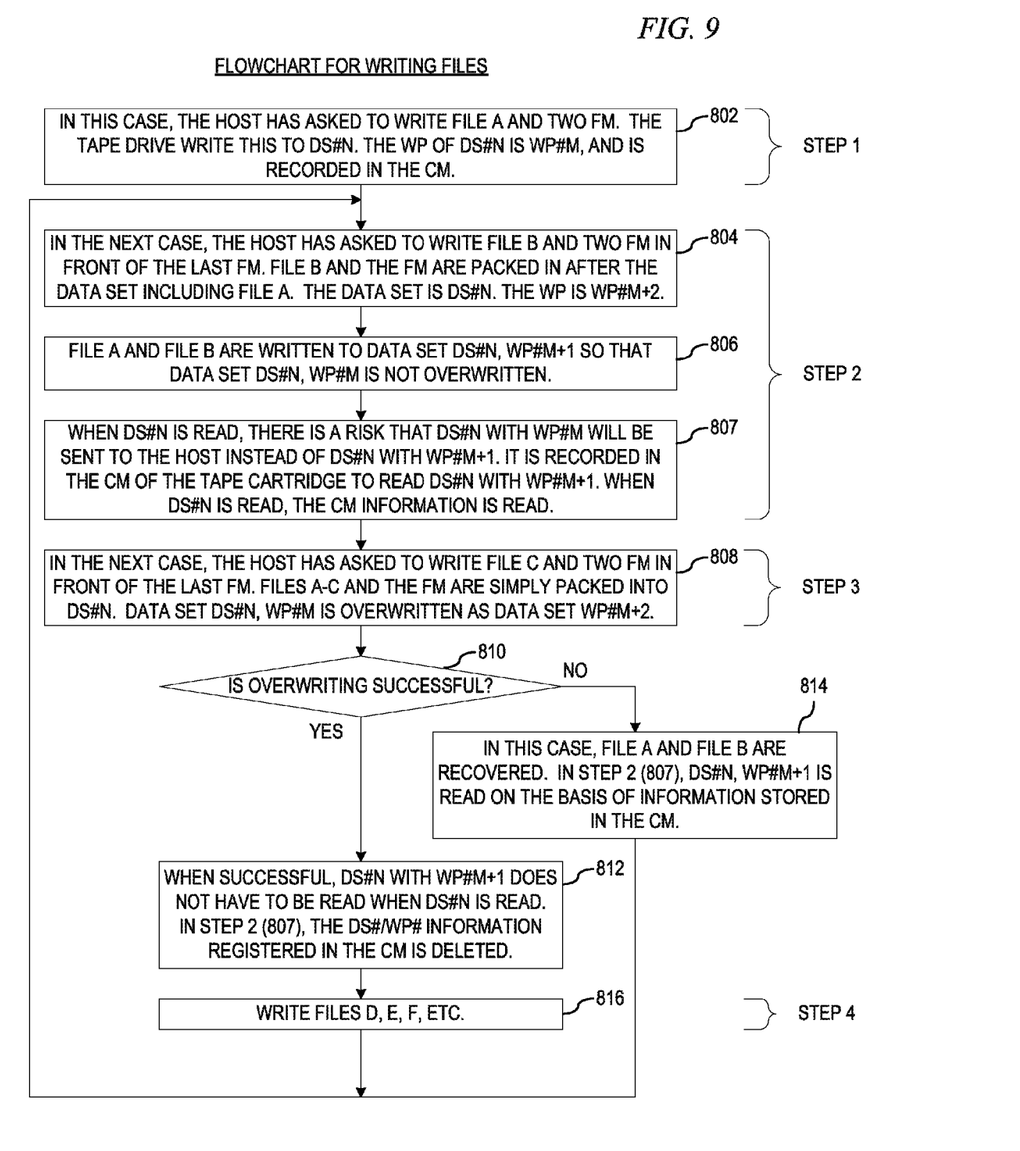
FIG. 9 depicts a flowchart showing the process for writing a file in the present invention.

FIG. 9 is a flowchart showing Steps 1-4 for file writing in the present invention.

1.(802) In this case, the host has asked to write File A and two FM. The tape drive writes all of this to data set DS#N. The WP of DS#N is WP#M, and this is recorded in the CM. Here, a second FM is packed into DS#N, but this is not a requirement of the present invention. Storing the second FM in DS#N+1 is also within the scope of the present invention.

2.(804) In the next case, the host has asked to write File B and two FM in front of the last FM. The tape drive packs in File B and the FM after the data set including File A, and writes this to the tape medium as DS#N, WP#M+2.

(806) At this time, unlike the conventional technique, the data set DS#N, WP#M. It is a characteristic of the present invention that data set DS#N, WP#M is not overwritten. File A and File B are written to data set DS#N, WP#M+1 after data set DS#N, WP#M.

(807) When DS#N is read as written, there is a risk that DS#N with WP#M will be sent to the host instead of DS#N with WP#M+1. When DS#N is read, the reading of DS#N with WP#M+1 is recorded to the non-volatile memory (CM: cartridge memory) in the tape cartridge. When data set DS#N is read, data set DS#N with WP#M+1 can be read on the basis of the recorded data in the CM.

3.(808) In the next case, the host has asked to write File C and two FM in front of the last FM. Files A-C and the FM are simply packed into DS#N as much as possible.

(810) DS#N is written to the tape medium as a data set WP#M+2 so that data set DS#N, WP#M is overwritten.

(812) In this case, the writing of File C was a success. In Step 3, the writing was a success across DS#N and two or more DS with WP#M+2 (DS#N, #N+1, etc.). Once the writing of this data set is successful, DS#N with WP#M+1 does not have to be read when DS#N is read. In Step 2, the DS#/WP# information registered in the CM is deleted. The data that does not fit into DS#N is stored as DS#N+1, #N+2, etc. and written to the tape.

(814) In this case, the writing of the DS to DS#N, WP#M+2 was a failure.

When C is written in Step 3 (808), File A and File B are read by the data drive. In Step 2 (807), the information in the failed DS#N, WP#M+2 is ignored on the basis of the information stored in the CM. The DS in DS#N is referenced in the CM, and the DS with WP#M+1 is read. Even when the writing of the DS in DS#N, WP#M+2 has failed, File A and File B can be recovered by reading the DS with WP#M+1.

4.(816) The process in Step 2 and Step 3 can be repeated for Files D, E, F, etc. Management of the corresponding relationships between the DataSet Numbers (DS#) and the WritePass Numbers (WP#) shown in FIG. 7 is not limited to the CM in the cartridge. For example, DS# and WP# can be stored in non-volatile memory installed in the tape drive.

In order to simplify the explanation, the size of the files was assumed to be less than half that of the capacity of the data set. The present invention is effective when the transaction size is sufficiently smaller than the size of the data set.

However, the present invention can be applied even in a case in which the file size is greater than the capacity (for example, 1.6 MB) of the data set. The start position for writing the newly written data set during writing of File B which is sufficiently larger than the size of the data set has sufficient separation from the previously written data set. Also, the present invention can be adapted by physically adjusting the timing for overwriting each data set.

When the size of File B is very large (several GB), the rewriting of several DS is interposed in Step 3 (808). When File C is written, the rewriting of File B to overwrite the DS at DS#N, WP#M (Step 3 (808)) is not practical because it takes too much time. Two DS#N with WP#M and WP#M+2 remain on the tape. However, there is no problem with reading DS as explained above. Also, compared to the conventional technique (explained with reference to FIG. 2), there are no problems from the standpoint of tape capacity.

When the size of File B is very large, the rewriting of B (Step 3 (808)) takes a long time. Without waiting to write File C, the DS at DS#N, WP#M can be overwritten in the DS data content immediately after the writing of the DS at DS#N,WP#M+2 has been successful. File B can be continuously written in the data after DS#N, that is, in DS#N+1 and thereafter. Because the tape has to be rewound one extra time (2-4 seconds), it takes a few seconds longer than the time required to simply write File B. However, this can avoid loss of tape capacity when two DS#N with WP#M and WP#M+2 remain on the tape.

In this process, the data set at DS#N, WP#M+2 is written at the start of Step 3. However, this can be performed at the end of Step 2 without waiting for the writing of File C. In this case, the processing in Step 2 can include the writing of File C. When the file continues to be written, the tape has to be rewound one extra time so that the writing of a data set at DS #N, WP#M+2 is performed in Step 2. As a result, this adversely affects performance. However, because the interval in which each file is written is more than a few seconds, the tape drive is idle for more than a few seconds. This is effective in that it does not require extra time and is easy to implement.

The effect on the capacity of the tape medium depends solely on the correlation between the size of the file and the size of the data set. When the capacity of the data set is C and the file size is F, the extra data written on the tape medium is a factor of C/F compared to the conventional technique. For example, when the capacity of the data set is 1.6 MB and the file size is 256 KB, the extra data written is a factor of 1.6 MB/256 KB=6.4.

As for the effect on writing performance, the writing method of the present invention can be expected to improve performance. For example, when the file size is 256 KB, two DS are written for each file in the conventional technique (explained with reference to FIG. 2). The technique of the present invention can be expected to improve performance because one DS is written once or twice.

The speed at which the tape moves is 1.5 [m/sec], and the tape drive can move the tape medium in an approximate range from 1.5 [m/sec] to 8.5 [m/sec]. In a case in which a small number of DS are written, it takes more time when the tape is accelerated and decelerated than when the tape operates at a constant speed. Therefore, selection of a slow tape speed improves performance. When the acceleration is 10 [m/sec2], the time of stable tape travel after acceleration is 0.4 [sec], and the length of the data set is 10 [cm], the time required to write one DS or two DS is calculated as follows.

One DS:4×1.5/10+0.4×2+1×0.1/1.5=1.47 [sec]

Two DS:4×1.5/10+0.4×2+2×0.1/1.5=1.53 [sec]

Also, in the conventional technique, it always has to go back one DS. In the technique of the present invention, while writing starts immediately after the last DS written in Step 2, it has to go back two DS in Step 3. The writing process of the present invention is qualitatively superior to the conventional technique in terms of performance. While there is a quantitative improvement of several percent, the difference is not significant.

The invention claimed is:

1. A method, in a data processing system, for writing files of less than fixed length to a tape medium, the method comprising:
    responsive to receiving a write request, writing a first file from a host to the tape medium as a set of datasets (DSs) when receiving files from the host, wherein the write request for each file is accompanied by a synchronization command (Flush) after the write command (Write) from the host;
    storing a DS number (DS#N) of a last DS and a WritePass (WP) number #M(WP#M) of a last write operation to nonvolatile memory;
    sequentially writing DSs filled with the first file and a second file to a DS following the last DS containing the first file to the tape medium when receiving the second file following the first file;
    assigning incremental DS numbering and WP number #M+1 to the DSs containing the second file and the first file;
    storing the DS numbers and the WP number associated with first file and the second file to the nonvolatile memory;
    overwriting a DS filled with the remaining portion of the first file, the second file, and a third file as DS#N and WP#M+2 when receiving the third file following the second file;
    writing the remaining portion after DS#N as incremental DS numbering to the tape medium; and
    storing information regarding WP#M+2 assigned to the DS numbering to the nonvolatile memory.

2. The method of claim 1, wherein, in a case in which the writing of DS(#N, WP#M+2) associated with the first file, the second file, and the third file is successful, the method further comprising:
    deleting previous DS numbers and WP numbers associated with the first file, the second file, and the third file from the non-volatile memory prior to storing the DS numbering and WP numbering associated with writing the first file, the second file, and the third file, wherein in a case in which DS#N is to be found, referencing the non-volatile memory and reading the DS numbers with WP#M+2.

3. The method of claim 1, wherein in a case in which the writing of DS(#N, WP#M+2) associated with the first file, the second file, and the third file has failed, the first, second or third file contained in the DS with WP#M+2 stored in the non-volatile memory is read in a case in which the DS#N is to be found.

4. The method of claim 2, wherein in a case in which a file is sufficiently smaller than the fixed length of the data set, a plurality of files are packed in a fixed-length data set to approach a recording density for writing of 100% with respect to the fixed length of the data set.

5. The method of claim 1, wherein the nonvolatile memory is cartridge memory (CM) in which a cartridge contains the tape medium.

6. The method of claim 1, wherein a file mark (FM) is written at an end of each written file following the synchronization command.

7. A computer program product comprising a computer readable storage medium having a computer readable program for writing files of less than a fixed length to a tape medium stored therein,
wherein the computer readable program, when executed on a computer, causes the computer to:
responsive to receiving a write request, write a first file from a host to the tape medium as a set of datasets (DSs) when receiving files from the host, wherein the write request for each file is accompanied by a synchronization command (Flush) after the write command (Write) from the host;
store a DS number (DS#N) of a last DS and a WritePass (WP) number #M(WP#M) of a last write operation to nonvolatile memory;
sequentially write DSs filled with the first file and a second file to a DS following the last DS containing the first file to the tape medium when receiving the second file following the first file;
assign incremental DS numbering and WP number #M+1 the DSs containing the second file and the first file;
store the DS numbers and the WP number associated with first file and the second file to the nonvolatile memory
overwrite a DS filled with the remaining portion of the first file, the second file, and a third file as DS#N and WPM#M+2 when receiving the third file following the second file;
write the remaining portion after DS#N as incremental DS numbering to the tape medium; and
store information regarding WP#M+2 assigned to the DS numbering to the nonvolatile memory.

8. The computer program product of claim 7, wherein, in a case in which the writing of DS(#N, WP#M+2) associated with the first file, the second file, and the third file is successful, the computer readable program further causes the computer to:
delete previous DS numbers and WP numbers associated with the first file, the second file, and the third file from the non-volatile memory prior to storing the DS numbering and WP numbering associated with writing the first file, the second file, and the third file, wherein in a case in which DS#N is to be found, referencing the non-volatile memory and reading the DS numbers with WP#M+2.

9. The computer program product of claim 7, wherein in a case in which the writing of DS(#N, WP#M+2) associated with the first file, the second file, and the third file has failed, the first, second or third file contained in the DS with WP#M+2 stored in the non-volatile memory is read in a case in which the DS#N is to be found.

10. The computer program product of claim 9, wherein in a case in which a file is sufficiently smaller than the fixed length of the data set, a plurality of files are packed in a fixed-length data set to approach a recording density for writing of 100% with respect to the fixed length of the data set.

11. The computer program product of claim 7, wherein the non-volatile memory is cartridge memory (CM) in which a cartridge contains the tape medium.

12. The computer program product of claim 7, wherein a file mark (FM) is written at an end of each written file following the synchronization command.

13. A tape recording device for recording in fixed-length data set (DS) units and for writing a file to a tape medium in accordance with a file writing request from a host, the tape recording device comprising:
a buffer for temporarily storing files from the host; and
a read/write control mechanism for reading and writing files to and from the tape medium in data set (DS) units, wherein the read/write control mechanism executes;
responsive to receiving a write request, writing a first file from the host to the tape medium as a set of datasets (DSs) when receiving files from the host, wherein the write request for each file is accompanied by a synchronization command (Flush) after the write command (Write) from the host;
storing a DS number (DS#N) of a last DS and a WritePass (WP) number #M(WP#M) of a last write operation to nonvolatile memory;
sequentially writing DSs filled with the first file and a second file to a DS following the last DS containing the first file to the tape medium when receiving the second file following the first file;
assigning incremental DS numbering and WP number #M+1 to the DSs containing the second file and the first file;
storing the DS numbers and the WP number associated with first file and the second file to the nonvolatile memory;
overwriting a DS filled with the remaining portion of the first file, the second file, and a third file as DS#N and WP#M+2 when receiving the third file following the second file;
writing the remaining portion after DS#N as incremental DS numbering to the tape medium; and
storing information regarding WP#M+2 assigned to the DS numbering to the nonvolatile memory.

14. The tape recording device of claim 13, wherein, in a case in which the writing of DS(#N, WP#M+2) associated with the first file, the second file, and the third file is successful, the read/write control mechanism further executes:
deleting previous DS numbers and WP numbers associated with the first file, the second file, and the third file from the non-volatile memory prior to storing the DS numbering and WP numbering associated with writing the first file, the second file, and the third file, wherein in a case in which DS#N is to be found, referencing the non-volatile memory and reading the DS numbers with WP#M+2.

15. The tape recording device of claim 13, wherein in a case in which the writing of DS(#N, WP#M+2) associated with the first file, the second file, and the third file has failed, the first, second or third file contained in the DS with WP#M+2 stored in the non-volatile memory is read in a case in which the DS#N is to be found.

16. The tape recording device of claim 15, wherein in a case in which a file is sufficiently smaller than the fixed length of the data set, a plurality of files are packed in a fixed-length data set to approach a recording density for writing of 100% with respect to the fixed length of the data set.

17. The tape recording device of claim 13, wherein the non-volatile memory is cartridge memory (CM) in which a cartridge contains the tape medium.

18. The tape recording device of claim 13, wherein a file mark (FM) is written at an end of each written file following the synchronization command.

* * * * *